United States Patent
Pan

(10) Patent No.: US 7,983,539 B2
(45) Date of Patent: Jul. 19, 2011

(54) CONTROL CIRCUIT FOR FAN

(75) Inventor: Ai-Yu Pan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 111 days.

(21) Appl. No.: 12/562,152

(22) Filed: Sep. 18, 2009

(65) Prior Publication Data
US 2011/0037424 A1    Feb. 17, 2011

(30) Foreign Application Priority Data
Aug. 11, 2009  (CN) .......................... 2009 1 0305519

(51) Int. Cl.
*H02P 7/29* (2006.01)

(52) U.S. Cl. ........ 388/811; 388/804; 388/805; 388/808; 318/400.3; 318/400.01; 323/311; 323/265; 323/282; 323/283; 323/284; 327/530; 363/44

(58) Field of Classification Search .................. 388/811, 388/804, 805, 808; 318/400.3, 400.01; 323/311, 323/265, 282, 283, 284; 327/530; 363/44
See application file for complete search history.

(56) References Cited

U.S. PATENT DOCUMENTS

| | | | |
|---|---|---|---|
| 6,329,727 B1 * | 12/2001 | Traveis et al. | 307/115 |
| 6,392,372 B1 * | 5/2002 | Mays, II | 318/400.01 |
| 6,396,231 B1 * | 5/2002 | Horng et al. | 318/471 |
| 6,545,438 B1 * | 4/2003 | Mays, II | 318/400.01 |
| 2003/0219239 A1 * | 11/2003 | Yu | 388/800 |

* cited by examiner

*Primary Examiner* — Rita Leykin
(74) *Attorney, Agent, or Firm* — Zhigang Ma

(57) ABSTRACT

When the fan inserted in the fan header is a 4-pin fan, the control chip outputs PWM signals with different duty factors to the control pin of the fan header, to automatically change the rotary speed of the 4-pin fan. When the fan inserted in the fan header is a 3-pin fan, the control chip outputs the PWM signals whose duty factor changes with temperature of a chip under the fan to control the first power source to provide a voltage to the adjusting circuit. The adjusting circuit rectifies the voltage output from the first power source as an analog voltage signal to the control circuit. The control circuit controls the third power source to output a changeable driving voltage to the power pin of the fan header to control the rotary speed of the 3-pin fan.

9 Claims, 2 Drawing Sheets

CONTROL CIRCUIT FOR FAN

BACKGROUND

1. Technical Field

The present disclosure relates to control circuits, and particularly to a control circuit for a fan of a computer.

2. Description of Related Art

Generally, a computer system includes a motherboard with various chips such as central processing units mounted on the motherboard, and a storage device such as a hard disk drive, each of which is known to generate heat when operating in the computer system. Typically, a computer fan is mounted on the motherboard to dissipate the heat timely.

Computer fans ordinarily include 3-pin fans and 4-pin fans. Generally, a 3-pin fan is connected to a motherboard by a 3-pin header mounted on the motherboard, and a 3-pin fan controller provides a voltage signal to the 3-pin fan. A 4-pin fan is connected to a motherboard by a 4-pin fan header mounted on the motherboard, a fourth pin of the 4-pin fan header is used to output a pulse-width modulation (PWM) signal, and a 4-pin fan controller is provided to supply the PWM signal to the 4-pin fan for adjusting a rotary speed of the 4-pin fan. However, the 3-pin fan can be connected to the 4-pin header, while a rotary speed of the 3-pin fan cannot be adjusted because the 3-pin fan does not have the fourth pin to receive the PWM signal.

DETAILED DESCRIPTION

Figure 1:
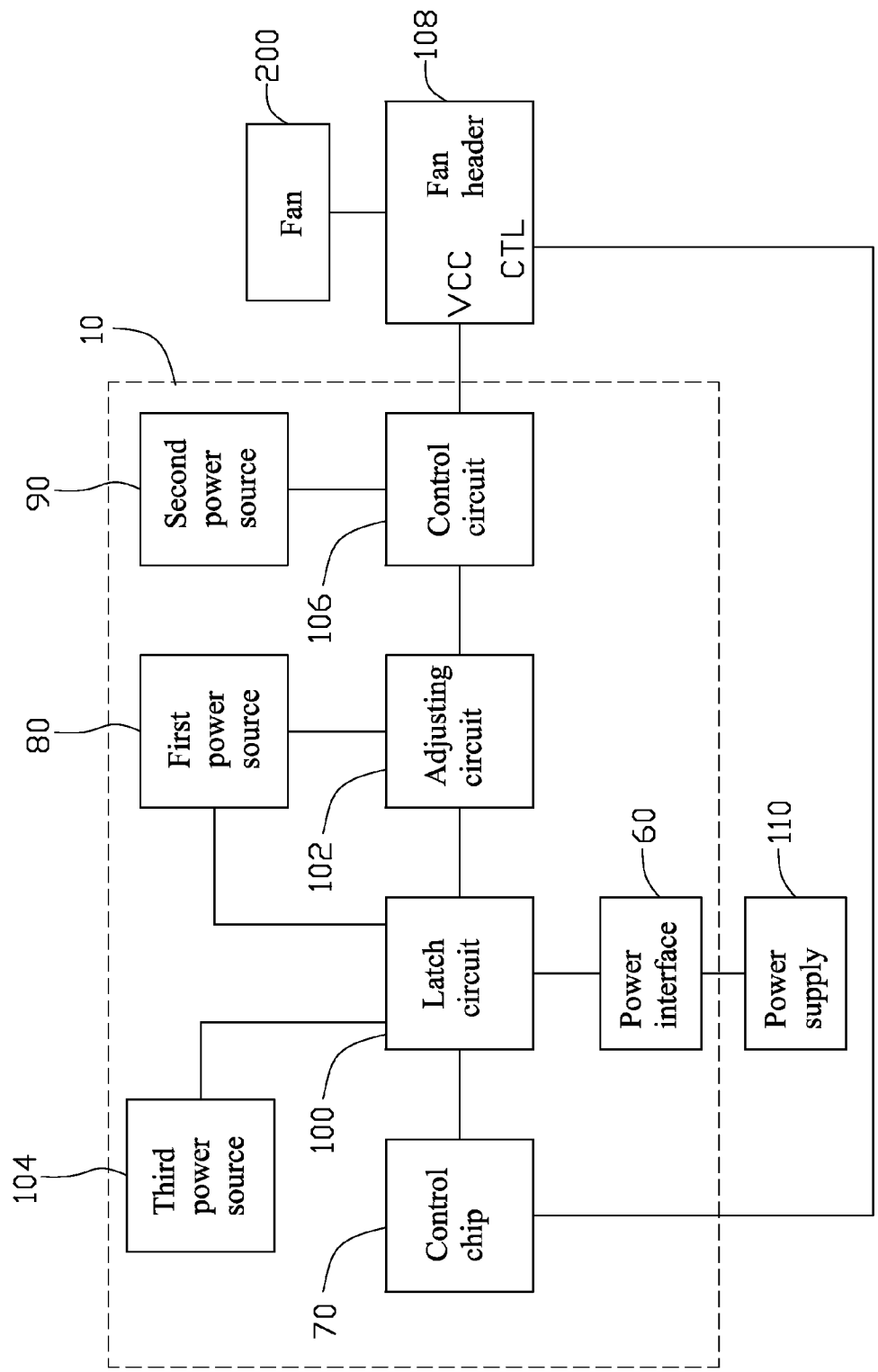
FIG. 1 is a block diagram of an embodiment of a control circuit for a fan connected to a fan header.

Referring to FIG. 1, an exemplary embodiment of a control circuit 10 is used to control a rotary speed of a computer fan 200 connected to a fan header 108, according to a type (such as a 3-pin fan or a 4-pin fan) of the computer fan 200. The computer fan 200 is mounted on a chip, such as a central processing unit, to dissipate heat generated by the chip. The control circuit 10 includes a power interface 60, a control chip 70, a first power source 80, a second power source 90, a third power source 104, a latch circuit 100, an adjusting circuit 102, and a control circuit 106. In one embodiment, the control chip 70 may be a super input/output (I/O) chip. The first power source 80 may be a +5 volt (V) power source. The second power source 90 may be a +12V power source. The third power source 104 may be a +5V standby power source.

The power interface 60 is connected to a power supply 110, to receive a high or low level signal from the power supply 110, and also connected to the latch circuit 100, to output the high or low level signal to the latch circuit 100. The control chip 70 is connected to the latch circuit 100, to turn on or turn off the latch circuit 100, and also connected to the fan header 108, to output pulse width modulation (PWM) signals with different duty factors to a control pin CTL of the fan header 108. The latch circuit 100 is connected to the power sources 80 and 104, to receive voltages from the power sources 80 and 104, and also connected to the adjusting circuit 102, to control the adjusting circuit 102 to rectify a voltage output from the first power source 80 as an analog voltage signal to the control circuit 106. The control circuit 106 is connected to the adjusting circuit 102, the second power source 90, and the fan header 108, to control the second power supply 90 to output a constant driving voltage (such as 12V) according to the analog voltage signal, and provides the constant driving voltage to a voltage pin VCC of the fan header 108, to provide power for the fan 200.

Figure 2:
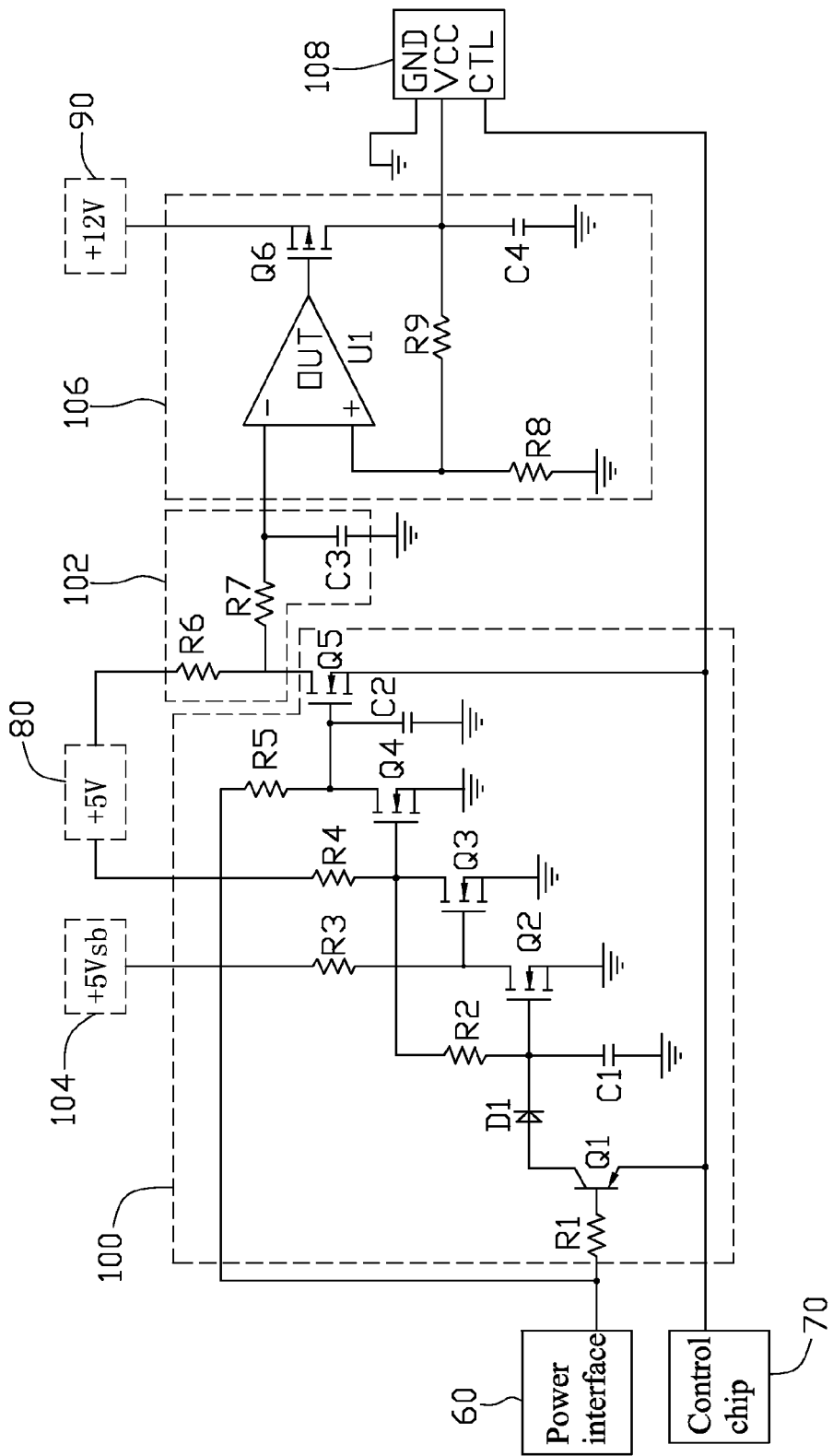
FIG. 2 is a circuit diagram of FIG. 1.

Referring to FIG. 2, the latch circuit 100 includes a transistor Q1, field effect transistors (FETs) Q2-Q5, resistors R1-R5, capacitors C1 and C2, and a diode D1. The base of the transistor Q1 is connected to the power interface 60 via the resistor R1. The emitter of the transistor Q1 is connected to the control chip 70, the source of the FET Q5, and the control pin CTL of the fan header 108. The collector of the transistor Q1 is connected to the anode of the diode D1. The cathode of the diode D1 is connected to the gate of the FET Q2, grounded via the capacitor C1, and connected to the drain of the FET Q3 and the gate of the FET Q4 via the resistor R2. The source of the FET Q2 is grounded. The drain of the FET Q2 is connected to the gate of the FET Q3 and connected to the third power source 104 via the resistor R3. The source of the FET Q3 is grounded. The drain of the FET Q3 is connected to the first power source 80 via the resistor R4. The source of the FET Q4 is grounded. The drain of the FET Q4 is grounded via the capacitor C2, connected to the gate of the FET Q5, and connected to the power interface 60 via the resistor R5. The drain of the FET Q5 is connected to the adjusting circuit 102.

The adjusting circuit 102 includes resistors R6 and R7, and a capacitor C3. The drain of the FET Q5 is connected to the first power source 80 via the resistor R6, connected to the control circuit 106 via the resistor R7, and grounded via the resistor R7 and the capacitor C3.

The control circuit 106 includes an amplifier U1, an FET Q6, resistors R8 and R9, and a capacitor C4. The inverting input terminal of the amplifier U1 is connected to a node between the resistor R7 and the capacitor C3. The non-inverting input terminal of the amplifier U1 is grounded via the resistor R8. The output terminal OUT of the amplifier U1 is connected to the gate of the FET Q6. The source of the FET Q6 is connected to the second power source 90. The drain of the FET Q6 is connected to the voltage pin VCC of the fan header 108 and grounded via the capacitor C4. The resistor R9 is connected between the non-inverting input terminal of the amplifier U1 and the drain of the FET Q6. The capacitor C4 can be deleted to save cost.

In use, when the fan 200 inserted in the fan header 108 is a 4-pin fan, the power interface 60 receives a low level (such as 0V) signal from the power supply 110. The base of the transistor Q1 receives a low level signal, and the transistor Q1 is turned on. The gate of the FET Q2 receives a high level signal from the collector of the transistor Q1, and the FET Q2 is turned on. The gate of the FET Q3 receives a low level signal from the drain of the FET Q2, and the FET Q3 is turned off. The gate of the FET Q4 receives a voltage from the first power source 80, and the FET Q4 is turned on. The gate of the FET Q5 receives a low level signal from the drain of the FET Q4, and the FET Q5 is turned off. The inverting input terminal of the amplifier U1 receives an adjusting voltage from the first power source 80 via the resistor R7 and the capacitor C3. The output terminal OUT of the amplifier U1 outputs a low level (such as 0V) signal. The gate of the FET Q6 receives the low level signal from the output terminal OUT of the amplifier U1, and the FET Q6 is turned on. The second power source 90 outputs a constant driving voltage (such as 1.8V) to the voltage pin VCC of the fan header 108.

When the computer is powered on, the power interface 60 receives a high level signal from the power supply 110. The resistor R2 latches the level signals of the gates of the FETs Q2 and Q4 at the high level, therefore, the gate of the FET Q5 keeps at the low level, and the FET Q5 is turned off. The second power source 90 outputs the constant driving voltage (such as 11.8V) to the voltage pin VCC of the fan header 108. The control chip 70 outputs a PWM signal with different duty factors according to a temperature of the chip under the fan 200 to the control pin CTL of the fan header 108, to change the rotary speed of the 4-pin fan 200 automatically.

When the fan 200 inserted in the fan header 108 is a 3-pin fan. The power interface 60 receives a low level (such as 0V) signal from the power supply 110. Because the 3-pin fan 200 does not include a control pin, therefore, the emitter of the transistor Q1 is similar to be grounded or suspending. The gate of the FET Q2 receives a low level signal from the collector of the transistor Q1, and the FET Q2 is turned off. The gate of the FET Q3 receives a high level signal from the drain of the FET Q2, and the FET Q3 is turned on. The gate of the FET Q4 receives a low level signal from the drain of the FET Q3, and the FET Q4 is turned off. The gate of the FET Q5 receives a high level signal from the power interface 60, and the FET Q5 is turned on. The control chip 70 outputs a PWM signal whose duty factors change with the temperature of the chip under the fan 200. The adjusting circuit 102 rectifies the voltage output from the first power source 80 as an analog voltage signal to the control circuit 106. The control circuit 106 controls the second power supply 90 to output a changeable voltage to the voltage pin VCC of the fan header 108, to control the rotary speed of the 3-pin fan 200.

When the computer is powered on, the power interface 60 receives a high level signal from the power supply 110. The resistor R2 latches the level signals of the gates of the FETs Q2 and Q4 at the low level, therefore, the gate of the FET Q5 keeps at the high level, and the FET Q5 is turned on. The control chip 70 outputs a PWM signal whose duty factor descends with the temperature of the chip under the fan 200, such as the duty factor changing to 10%, the first power supply 80 provides a voltage to the adjusting circuit 102. The adjusting circuit 102 rectifies the voltage output from the first power source 80 as an analog voltage signal (such as 1.7V) to the inverting input terminal of the amplifier U1. The output terminal OUT of the amplifier U1 outputs a start voltage, such as 11.2V. The FET Q6 is turned on, with a low voltage difference between the gate and the source of the FET Q6. The second power source 90 outputs a low driving voltage (such as 5.8V) to the voltage pin VCC of the fan header 108, the fan 200 runs at a lower speed. When the control chip 70 outputs a PWM signal whose duty factor rises with the temperature of the chip under the fan 200, such as the duty factor changing to 80%, the first power supply 80 provides a voltage to the adjusting circuit 102. The adjusting circuit 102 rectifies the voltage output from the first power source as an analog voltage signal (such as 10.2V) to the inverting input terminal of the amplifier U1. The output terminal OUT of the amplifier U1 outputs a start voltage, such as 10.1V. The FET Q6 is turned on, with a high voltage difference between the gate and the source of the FET Q6. The second power supply 90 outputs a high driving voltage (such as 11.3V) to the voltage pin VCC of the fan header 108, the fan 200 runs at a higher speed.

The control circuit 10 can detect the type of the fan 200 inserted in the fan header 108 automatically, and control the rotary speed of the fan 200 according to the type of the fan 200. The control circuit 10 is simple and cost saving.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A control circuit for a fan mounted on a chip, the control circuit comprising:
   a power interface connected to a power supply, to receive a high or low level signal from the power supply;
   a latch circuit connected to the power interface, to receive the high or low level signal from the power interface, and connected to a first and a second power sources, to receive voltages from the first and the second power source;
   a control chip connected to the latch circuit, to turn on or turn off the latch circuit, and also connected to a fan header mountable for the fan, to output pulse width modulation (PWM) signals with different duty factors to a control pin of the fan header;
   an adjusting circuit connected to the latch circuit, to rectify a voltage output from the first power source as an analog voltage signal; and
   a control circuit connected to the adjusting circuit, and a third power source, to control the third power source to output a constant driving voltage according to the analog voltage signal, and provide the constant driving voltage to a voltage pin of the fan header, to provide power for the fan;
   wherein when the fan inserted in the fan header is a 4-pin fan, the control chip output the PWM signals with different duty factors to the control pin of the fan header, to automatically change the rotary speed of the 4-pin fan, wherein when the fan inserted in the fan header is a 3-pin fan, the control chip outputs the PWM signals whose duty factor changes with a temperature of the chip under the fan to control the first power source to provide a voltage to the adjusting circuit, the adjusting circuit rectifies the voltage output from the first power source as an analog voltage signal to the control circuit, and the control circuit controls the third power source to output a changeable driving voltage to the power pin of the fan header to control the rotary speed of the 3-pin fan.

2. The control circuit of claim 1, wherein the latch circuit comprises a transistor, first to fourth field effect transistors (FETs), first to fifth resistors, first and second capacitors, and a diode, the base of the transistor is connected to the power interface via the first resistor, the emitter of the transistor is connected to the control chip, the source of the fourth FET, and the control pin of the fan header, the collector of the transistor is connected to the anode of the diode, the cathode of the diode is connected to the gate of the first FET, grounded via the first capacitor, connected to the drain of the second FET and the gate of the third FET via the second resistor, the source of the first FET is grounded, the drain of the first FET is connected to the gate of the second FET, and also connected to the second power source via the third resistor, the source of the second FET is grounded, the drain of the second FET is connected to the first power source via the fourth resistor, the source of the third FET is grounded, the drain of the third FET is grounded via the second capacitor, connected to the gate of the fourth FET, and connected to the power interface via the fifth resistor, the drain of the fourth FET is connected to the adjusting circuit.

3. The control circuit of claim 2, wherein the adjusting circuit comprises sixth and seventh resistors, and a third capacitor, the drain of the fourth FET is connected to the first power source via the sixth resistor, connected to the control circuit via the seventh resistor, and grounded via the seventh resistor and the third capacitor.

4. The control circuit of claim 3, wherein the control circuit comprises an amplifier, a fifth FET, eighth and ninth resistors, the inverting input terminal of the amplifier is connected a node between the seventh resistor and the third capacitor, the non-inverting input terminal of the amplifier is grounded via the eighth resistor, the output terminal of the amplifier is connected to the gate of the fifth FET, the source of the fifth FET is connected to the third power source, the drain of the fifth FET is connected to the voltage pin of the fan header, the ninth resistor is connected between the non-inverting input terminal of the amplifier and the drain of the fifth FET.

5. The control circuit of claim 4, wherein the control circuit further comprises a fourth capacitor, the fourth capacitor is connected between the drain of the fifth FET and ground.

6. The control circuit of claim 1, wherein the first power source is a +5 volt power source.

7. The control circuit of claim 1, wherein the second power source is a +5 volt standby power source.

8. The control circuit of claim 1, wherein the third power source is a +12 volt power source.

9. The control circuit of claim 1, wherein the control chip is a super input/output chip.

* * * * *